(12) United States Patent
Roh et al.

(10) Patent No.: US 8,040,474 B2
(45) Date of Patent: Oct. 18, 2011

(54) MOLD AND METHOD OF MANUFACTURING DISPLAY DEVICE

(75) Inventors: Nam-seok Roh, Gyeonggi-do (KR);
Mun-pyo Hong, Gyeonggi-do (KR);
Jae-hyuk Chang, Gyeonggi-do (KR);
Jung-mok Bae, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 803 days.

(21) Appl. No.: 11/704,015

(22) Filed: Feb. 7, 2007

(65) Prior Publication Data
US 2007/0202709 A1   Aug. 30, 2007

(30) Foreign Application Priority Data
Feb. 8, 2006   (KR) .................. 10-2006-0012113

(51) Int. Cl.
*G02F 1/1335*   (2006.01)
*H01L 21/00*   (2006.01)
(52) U.S. Cl. .................................. 349/113; 438/30
(58) Field of Classification Search .............. 349/113; 438/30
See application file for complete search history.

(56) References Cited

U.S. PATENT DOCUMENTS

| 7,475,997 B2* | 1/2009 | Fujiwara et al. ............. 359/529 |
| 2004/0046923 A1 | 3/2004 | Shiao et al. |
| 2007/0262936 A1* | 11/2007 | Chang et al. ................... 345/87 |

FOREIGN PATENT DOCUMENTS

| CN | 1455270 | 11/2003 |
| JP | 02-289311 | 11/1990 |
| JP | 10-260413 | 9/1998 |
| JP | 11-202326 | 7/1999 |
| JP | 2000-089003 | 3/2000 |
| JP | 2001-310334 | 11/2001 |
| JP | 2002-090729 | 3/2002 |
| JP | 2005-161529 | 6/2005 |
| JP | 2005-197699 | 7/2005 |

* cited by examiner

*Primary Examiner* — Jerry Rahll
(74) *Attorney, Agent, or Firm* — Innovation Counsel LLP

(57) ABSTRACT

A mold for a display device, comprising a supporting frame; at least one pattern forming part provided on a surface of the supporting frame; and a protrusion projecting from the supporting frame and disposed along the circumference of the pattern forming part, an inside wall of the protrusion toward the pattern forming part standing upright from the surface of the supporting frame.

7 Claims, 13 Drawing Sheets

MOLD AND METHOD OF MANUFACTURING DISPLAY DEVICE

CROSS-REFERENCE TO RELATED APPLICATIONS

This application claims the benefit of Korean Patent Application No. 2006-0012113, filed on Feb. 8, 2006, in the Korean Intellectual Property Office, which is hereby incorporated by reference for all purposes as if fully set forth herein.

BACKGROUND

1. Field of the Invention

The present invention relates to a mold for a display device and a manufacturing method of a display device using the same.

2. Description of the Related Art

In general, liquid crystal displays (LCDs) are classified into a transmissive type, a transflective type and a reflective type depending on a type of a light source. A transmissive LCD includes a backlight unit disposed in rear side of an LCD panel so that light from the backlight unit passes through the LCD panel. A reflective LCD uses natural light as a light source and may consume less electric power by limiting use of the backlight unit which accounts for about 70% of the total electric power consumption in the transmissive LCD. A transflective LCD, which has advantages of both the transmissive type and the reflective type, may obtain adequate brightness for the desired purpose regardless of a change in brightness of a surrounding natural light by using both the natural light and the backlight unit.

In the reflective LCD and the transflective LCD, a passivation layer is deposited on a substrate where thin film transistors are formed, and a concavo-convex pattern or an embossing pattern is formed thereon. A reflective layer is formed on the entire surface of the embossing pattern to make a reflective LCD. A reflective layer is formed on a portion of the embossing pattern to make a transflective LCD. The concavo-convex pattern or the embossing pattern is provided to induce light to be diffusively reflected or dispersed and to increase reflectance of the light. The concavo-convex pattern or the embossing pattern is formed by aligning a mold having a pattern corresponding to the particular pattern over the passivation layer and pressing the mold against the passivation layer. A portion of the passivation layer where the pattern is not formed is removed by being exposed and developed using a mask.

However, the passivation layer may have an undesired remaining pattern at the edge thereof, or an unnecessary portion thereof may still remain due to resolution limitation of the mask and diffraction of light when exposed.

SUMMARY

According to one aspect of the present invention a mold for a display device that improves the yield of a desired pattern comprises a supporting frame; at least one pattern forming part provided on a surface of the supporting frame; and a protrusion projecting from the supporting frame and disposed along the circumference of the pattern forming part, an inside wall of the protrusion toward the pattern forming part standing upright from the surface of the supporting frame.

According to another embodiment of the invention, a flat part is formed around the pattern forming part, and the protrusion is disposed on a boundary region between the flat part and the pattern forming part.

According to another embodiment of the invention, an outside wall of the protrusion inclines to the surface of the supporting frame so that a cross-sectional area of the protrusion taken along transversely becomes smaller further from the supporting frame.

According to another embodiment of the invention, the mold further comprises a mask placed on an opposite surface of the supporting frame and having an opening corresponding to the pattern forming part.

According to another embodiment of the invention, the pattern forming part has a concavo-convex pattern.

According to another embodiment of the invention, the angle between the inside wall of the protrusion and the surface of the supporting frame is substantially in the range of 80 degrees to 100 degrees.

According to another embodiment of the invention, the width of the protrusion is substantially in the range of 5 μm to 20 μm.

According to another embodiment of the invention, the supporting frame and the protrusion comprise polydimethylsiloxane (PDMS).

According to an embodiment of the invention, there is provided a manufacturing method of a display device comprising providing an insulating substrate; forming a passivation layer on the insulating substrate; aligning a mold provided with a pattern forming part on the passivation layer; and pressing the mold to form a pattern corresponding to the pattern forming part on the passivation layer.

According to another embodiment of the invention, the manufacturing method further comprises curing the passivation layer while pressing the mold.

According to another embodiment of the invention, the passivation layer comprises organic polymer and is cured by at least one of heat and light.

According to another embodiment of the invention, the manufacturing method further comprises removing the mold; and exposing and developing the passivation layer with a mask which has a light-transmitting opening corresponding to a pattern forming part provided in the mold and is disposed over the passivation layer and removing an unpatterned portion of the passivation layer.

According to another embodiment of the invention, the mold further comprises a mask having an opening corresponding to the pattern forming part and placed on an opposite surface of a supporting frame provided in the mold, the manufacturing method further comprising exposing and developing the passivation layer and removing an unpatterned portion of the passivation layer after pressing the mold.

According to another embodiment of the invention, the manufacturing method further comprises forming a gate wiring and a data wiring insulatedly crossing the gate wiring to define a pixel region on the insulating substrate before forming the passivation layer; and forming a thin film transistor at an intersection area where the gate wiring and the data wiring cross each other, wherein the pattern forming part is disposed to correspond to at least a portion of the pixel region.

According to another embodiment of the invention, the manufacturing method further comprises forming a pixel electrode on the passivation layer and forming a reflective layer at least on a portion of the pixel electrode after removing the mold.

According to another embodiment of the invention, a flat part is formed around the pattern forming part, and the protrusion is disposed on a boundary region between the flat part and the pattern forming part.

According to another embodiment of the invention, an outside wall of the protrusion inclines to the surface of the supporting frame so that a cross-sectional area of the protrusion taken along transversely becomes smaller as it moves far from the supporting frame.

According to another embodiment of the invention, the pattern forming part has a concavo-convex pattern.

According to another embodiment of the invention, the angle between the inside wall of the protrusion and the surface of the supporting frame is substantially in the range of 80 degrees to 100 degrees.

According to another embodiment of the invention, the width of the protrusion is substantially in the range of 5 μm to 20 μm.

According to another embodiment of the invention, the supporting frame and the protrusion comprises polydimethylsiloxane (PDMS).

BRIEF DESCRIPTION OF THE DRAWINGS

A further understanding of the invention may be obtained from a reading of the ensuing description, together with the drawing, in which.

Figure 1A:
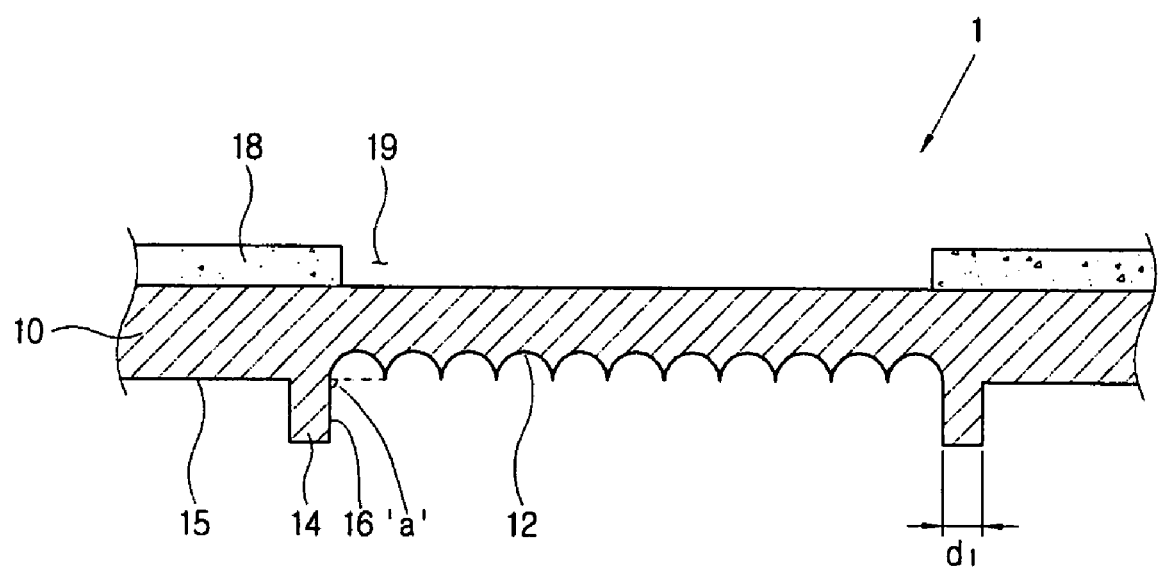
FIG. 1A shows a mold according to a first embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

As shown in FIG. 1A, a mold 1 for a display device according to a first embodiment of the present invention includes a supporting frame 10, a pattern forming part 12 provided on one surface of supporting frame 10 and a protrusion 14 projecting from supporting frame 10 and disposed along the circumference of pattern forming part 12.

A flat part 15 is formed on the surface of supporting frame 10 around pattern forming part 12. Protrusion 14 is disposed on a boundary region between flat part 15 and pattern forming part 12. An inside wall 16 of protrusion 14 toward pattern forming part 12 stands upright from the surface of supporting frame 10. Accordingly, when an organic layer is patterned by the mold 1, protrusion 14 presses the edge of the organic layer and removes unnecessary portions of the organic layer, thereby improving the yield of the pattern. In other words, the unnecessary pattern resulting from the resolution limit of the mask and diffraction of light on the circumference of the organic layer is removed by protrusion 14, thereby improving the yield of the pattern.

A mask 18 has an opening 19 corresponding to pattern forming part 12 and adheres to the opposite surface of supporting frame 10. Mask 18 is provided in a single body with supporting frame 10 in the mold 1 according to the first embodiment of the present invention, but it may also be provided separately from supporting frame 10. A pattern is formed on pattern forming part 12 to correspond to a desired pattern to be formed on the organic layer, which may be a concavo-convex pattern or an embossing pattern. An angle (a) between the inside wall 16 of protrusion 14 and the surface of supporting frame 10 may be in the range of 80 degrees to 100 degrees. The range of the angle is an error range where the pattern may efficiently be provided. If the angle (a) is out of the range, a remaining layer may remain on the edge of the organic layer and the desired pattern may not be formed. The width (d1) of an end portion of protrusion 14 may be in a range of 5 μm to 20 μm to efficiently remove the organic layer. If the width (d1) of protrusion 14 is large, the pressed organic material having not enough fluidity on an area corresponding to the end portion of protrusion 14 will not be removed but remain, thereby not forming the desired pattern. If the width d1 of protrusion 14 is too small, the organic layer may not be removed efficiently. The mold 1 may include polydimethylsiloxane (PDMS).

Hereinafter, a mold for a display device according to a second embodiment of the present invention will be described with reference to FIG. 1B. It should be noted that the following description will be made to only different features from those of the first embodiment, and description to the remaining similar features will not be repeated herein.

Figure 1B:
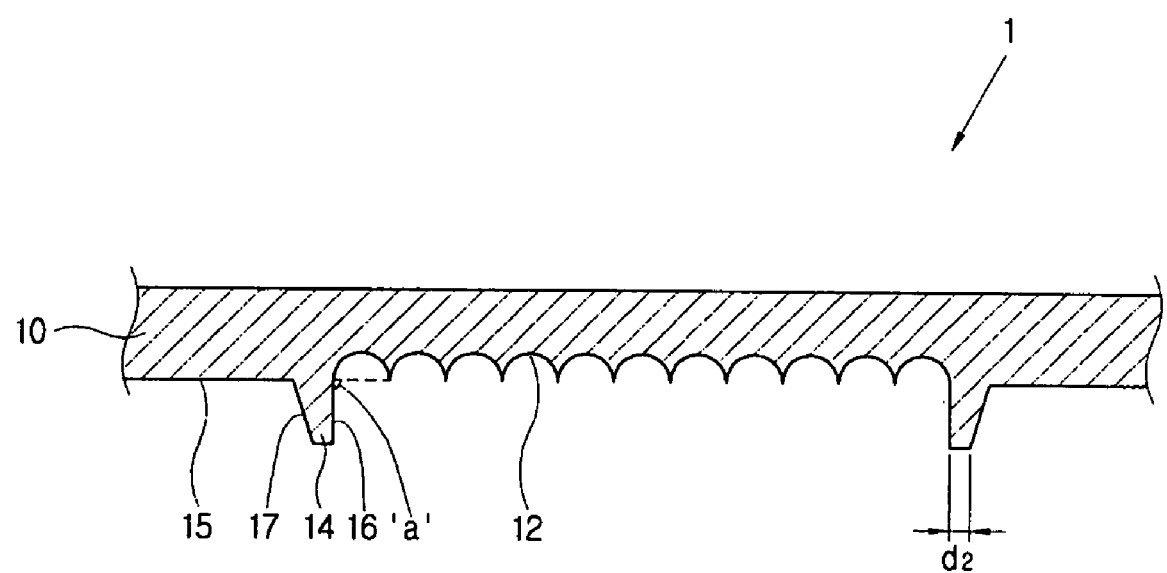
FIG. 1B shows a mold according to a second embodiment of the present invention.

As shown in FIG. 1B, in a mold 1 for a display device according to a second embodiment of the present invention, protrusion 14 has a shape such that the cross-sectional area becomes smaller further from supporting frame 10. That is, an inside wall 16 of protrusion 14 stands perpendicular to the surface of supporting frame 10, and an outside wall 17 thereof inclines toward the surface of supporting frame 10. The width d2 of the end portion of protrusion 14 may be in the range of 5 μm to 20 μm. Protrusion 14 having the aforementioned shape allows an organic layer to be efficiently removed when the mold 1 presses an organic layer. A mask may be adhered to another surface of the mold 1 for the display device according to the second embodiment of the present invention.

A method of manufacturing a display device using the mold according to the present invention will be described with reference to drawings. In the drawings, the thickness of the layers, film, and regions are exaggerated for clarity. When an element such as a layer, film, region, or substrate is referred to as being "on" another element, it can be directly on the other element or intervening elements may also be present.

Figure 2:
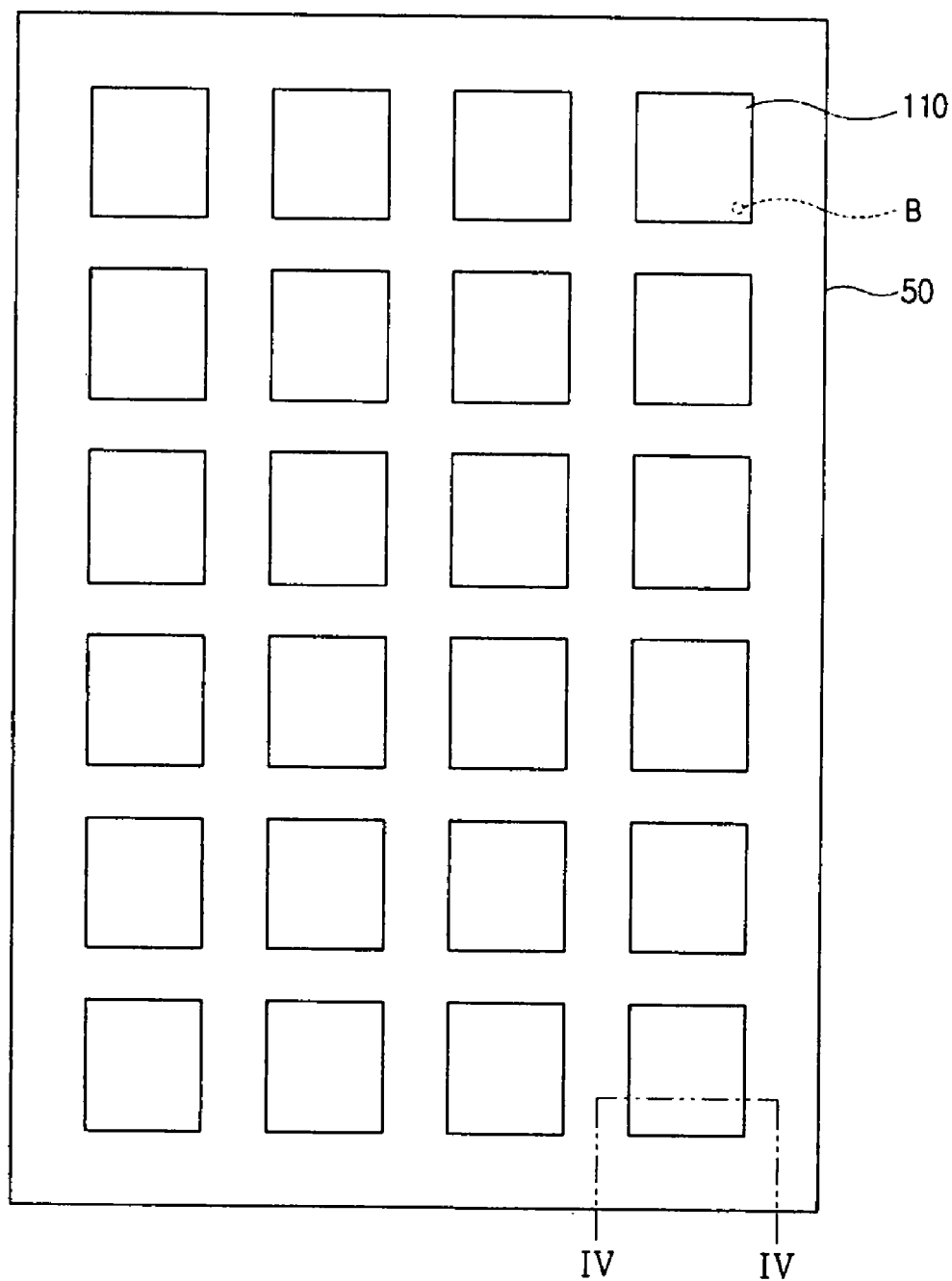
FIG. 2 is a plan view of an insulating substrate according to the present invention.
Figure 3A:
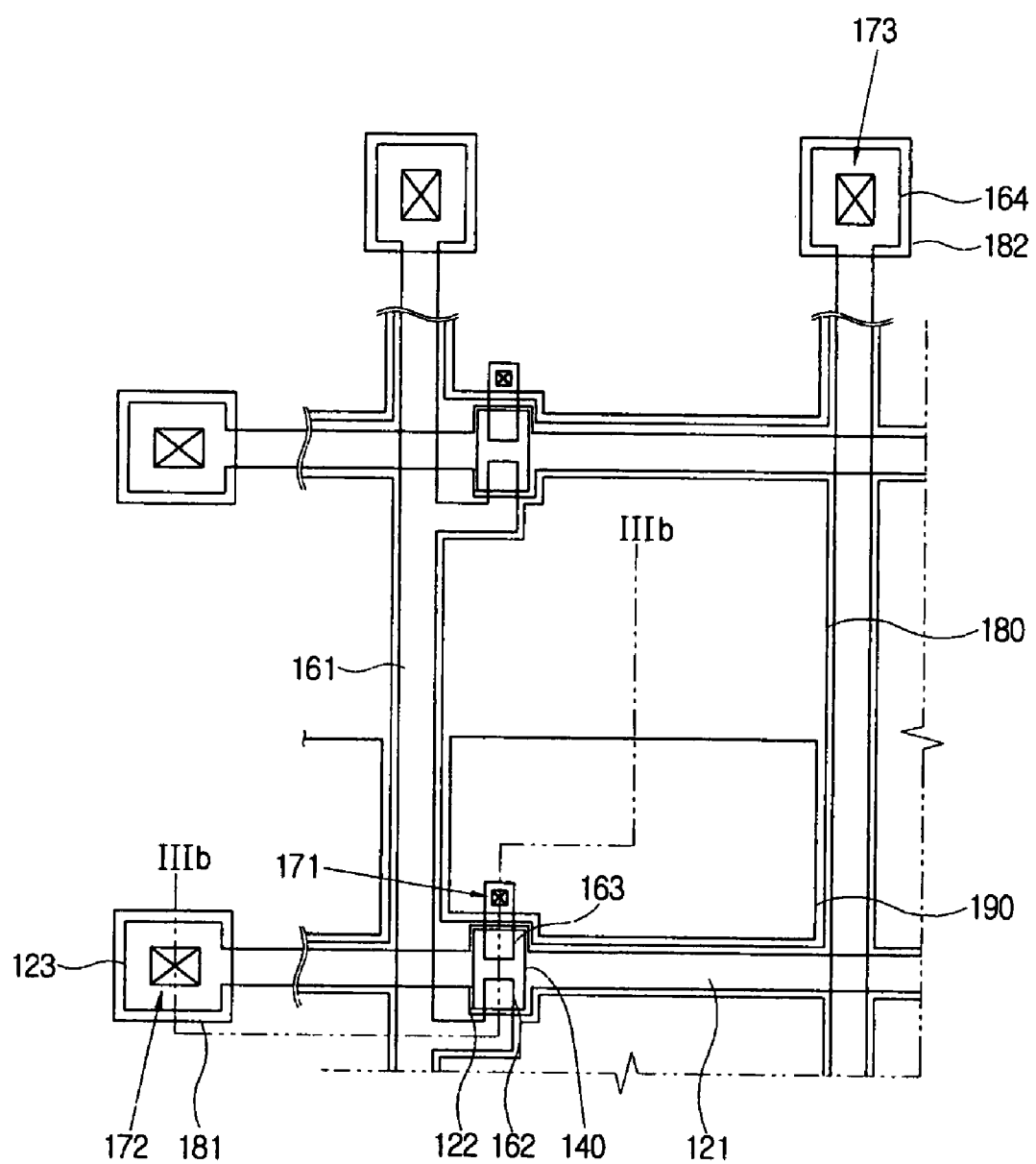
FIG. 3A is an arrangement view of area 'B' in FIG. 2.
Figure 3B:
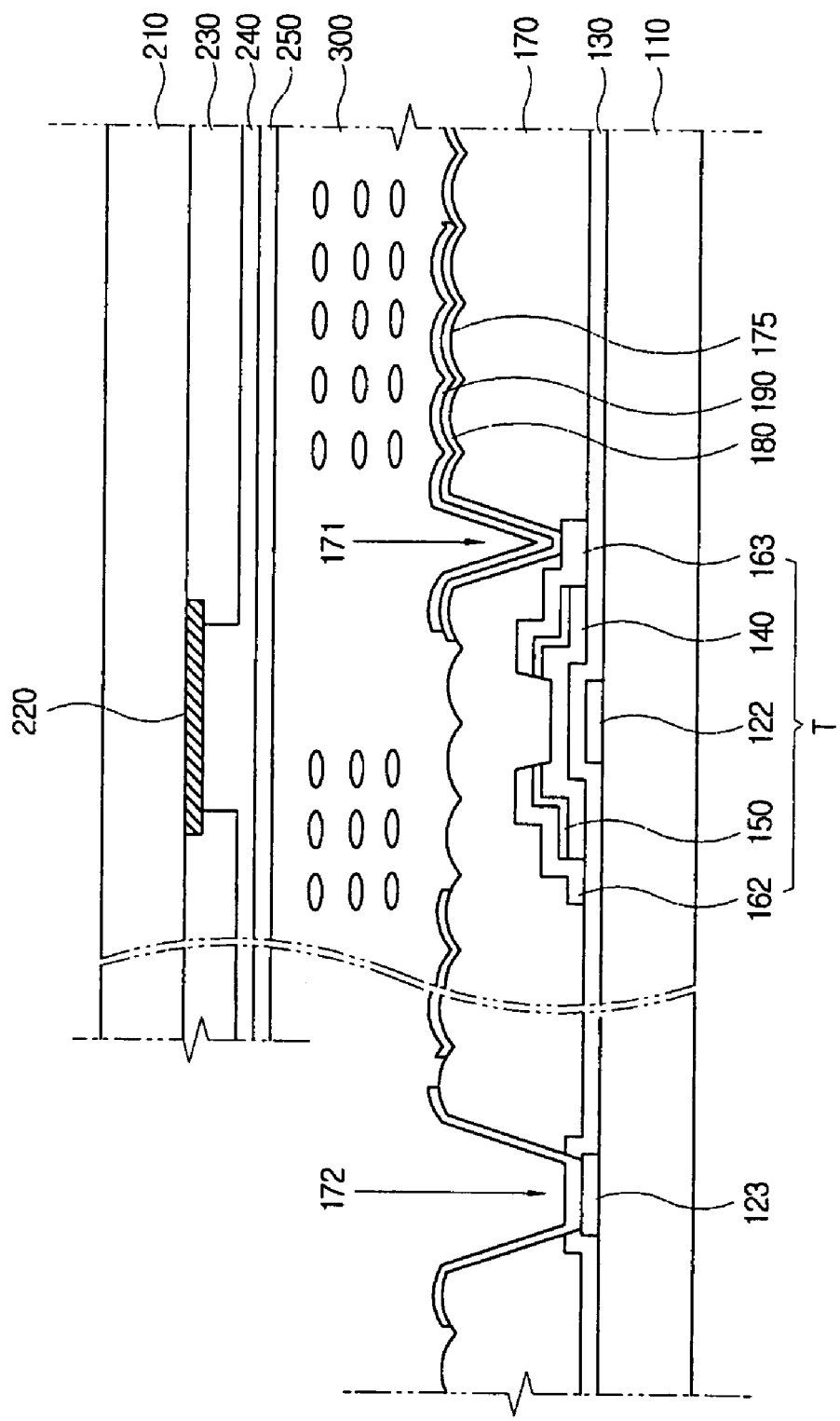
FIG. 3B is a sectional view, taken along line IIIb-IIIb in FIG. 3A.

FIG. 2 is a plan view of an insulating substrate according to the present invention; FIG. 3A is an arrangement view of area 'B' in FIG. 2; and FIG. 3B is a sectional view, taken along line IIIb-IIIb in FIG. 3A.

An LCD panel according to the present invention includes a thin film transistor substrate (first substrate) 100, a color filter substrate (second substrate) 200 facing thin film transistor substrate, and a liquid crystal layer 300 interposed therebetween.

First, thin film transistor substrate 110 will be described as follows.

As shown in FIG. 2, a plurality of first substrates 100 are manufactured from one big substrate 50. The resultant thin film transistor substrate 100 is formed by using first insulating substrates 110 through a series of manufacturing processes. An organic passivation layer formed between each of the first insulating substrates 110 is removed through processes of exposure and development.

Gate wiring 121, 122 and 123 is formed on the first insulating substrate 110 and may be either a single metal layer or multi-metal layers. Gate wiring 121, 122 and 123 includes a gate line 121 extended in transverse direction, a gate electrode 122 connected to the gate line 121, and a gate pad 123 connected to a driving chip (not shown) to be applied with a driving signal.

Gate insulating layer 130 is made of silicon nitride (SiNx) or the like and formed on the first insulating layer 110 to cover the gate wiring 121, 122 and 123.

Semiconductor layer 140 is made of amorphous silicon or the like and formed on gate insulating layer 130 of gate electrode 122. An ohmic contact layer 150 is made of n+ hydrogenated amorphous silicon which is highly-doped with silicide or n-type impurities and formed on the semiconductor layer 140. Ohmic contact layer 150 is removed in a channel region between a source electrode 162 and a drain electrode 163.

Data conductors 161, 162, 163 and 164 are formed on ohmic contact layer 150 and gate insulating layer 130. Data conductors 161, 162, 163 and 164 may be either a single metal layer or multi-metal layers as well. Data conductors 161, 162, 163 and 164 includes a data line 161 extended in a vertical direction and crossing gate line 121 to define a pixel area, source electrode 162 branching from the data line 161 and extending over ohmic contact layer 150. Drain electrode 163 is separated from the source electrode 162 and formed over ohmic contact layer 150 opposite to source electrode 162 across gate electrode 122. Data pad 164 is provided at an end portion of the data line 161 to be connected to a driving chip (not shown).

A passivation layer 170 is formed on data conductors 161, 162, 163 and 164 and a portion of semiconductor layer 140, which is not covered with data conductors 161, 162, 163 and 164. An embossing pattern 175 is formed on e passivation layer 170. Further, drain contact hole 171, gate pad contact hole 172 and a data pad contact hole are formed in passivation layer 170. Drain contact hole 171 is provided to expose drain electrode 163, and gate pad contact hole 172 and data pad contact hole 173 are provided to connect the driving chips (not shown) and gate line 121 and data line 161 so that the driving chips apply driving signals to gate line 121 and data line 161. Embossing pattern 175 formed on e passivation layer 170 is provided to diffuse light, thereby enhancing reflectance. An inorganic insulating layer including silicon nitride or the like is further formed between passivation layer 170 and thin film transistor (T) in order to increase the efficiency of the thin film transistor. Passivation layer 170 may be a high cohesive organic layer so as to keep a predetermined shape, or a low cohesive organic layer so as not to keep a predetermined shape but to be cured by ultraviolet rays or heat.

Pixel electrode 180 is formed on passivation layer 170 where the embossing pattern 175 is formed. Pixel electrode 180 is generally made of a transparent conductive material such as indium tin oxide (ITO) or indium zinc oxide (IZO). Pixel electrode 180 is electrically connected to drain electrode 163 through drain contact hole 171. Contact subsidiary parts 181 and 182 are formed on gate pad contact hole 172 and data pad contact hole 173, respectively. Contact subsidiary parts 181 and 182 are usually made of ITO or IZO. An embossing pattern is formed on pixel electrode 180 by embossing pattern 175 formed on passivation layer 170.

Reflective layer 190 is formed on pixel electrode 180. The pixel area formed by gate line 121 and data line 161 is divided into a transmitting area in which reflective layer 190 is not present and a reflecting area in which reflective layer 190 is present. Light from a backlight unit (not shown) passes through and is radiated to the outside of an LCD panel in the transmitting area, and light from the outside is reflected and is irradiated back to the outside of the LCD panel in the reflecting area covered with e reflecting layer 190. e Reflective layer 190 is generally made of aluminum or silver or may include an aluminum/molybdenum double-layer as well. Reflective layer 190 is electrically connected to e drain electrode 163 through drain contact hole 171. Further, an embossing pattern is also formed on reflective layer 190 by the embossing pattern on pixel electrode 180.

Next, color filter substrate 200 will be described as follows.

A black matrix 220 is formed on a second insulating substrate 210. Black matrix 220 is disposed between the red, green and blue filters to divide the filters and prevents light from being irradiated directly to thin film transistor (T) disposed on the first insulating substrate 110. Black matrix 220 is typically made of a photoresist organic material including a black pigment. The black pigment may be carbon black, titanium oxide or the like.

Color filter layer 230 includes the red, green and blue filters which are alternately disposed and separated from each other by black matrix 220. Color filter layer 230 endows colors to light from the backlight unit (not shown) and passing through liquid crystal layer 300. Color filter layer 230 is generally made of a photoresist organic material.

Overcoat layer 240 is formed on color filter layer 230 and black matrix 220 which is not covered with the color filter layer 230. Overcoat layer 240 protects color filter layer 230 and is provided with a plan surface. Overcoat layer 240 is generally made of an acrylic epoxy material.

Common electrode 250 is formed on overcoat layer 240. Common electrode 250 includes a transparent conductive material such as ITO or IZO. Common electrode 250 directly applies voltage toe liquid crystal layer 300 with pixel electrode 180 of thin film transistor substrate 100.

Subsequently, liquid crystal layer 300 is injected between thin film transistor substrate 100 and color filter substrate 200, and both substrates 100 and 200 adhere to each other by a sealant (not shown), then the LCD panel is finished.

Hereinafter, a method of manufacturing a display device according to the first embodiment of the present invention will be described with a manufacturing method of a thin film transistor substrate as an example. FIGS. 4A through 4D are sectional views, taken along line IV-IV in FIG. 2, illustrating a method of forming the embossing pattern 175 on passivation layer 170 of first substrate 100. In the first embodiment, thin film transistor substrate is manufactured by a mold shown in FIG. 1, for example.

Referring to FIGS. 3A and 3B, a gate conductor material is deposited on first insulating substrate 110 and patterned by photolithography using a mask to form gate conductors 121, 122 and 123. Then, gate insulating layer 130, semiconductor layer 140 and ohmic contact layer 150 are sequentially deposited thereon.

Semiconductor layer 140 and ohmic contact layer 150 are formed by photolithography.

A data conductor material is deposited thereon and patterned by a photolithography to form data conductors 161, 162, 163 and 164. Subsequently, a portion of ohmic contact layer 150 not covered with data conductors 161, 162, 163 and 164 is etched and divided into two parts with respect to gate electrode 122 exposing semiconductor layer 140 therebetween. In this process, ohmic contact layer 150 is removed for the most part, and semiconductor layer 140 is partly etched. Additionally, an oxygen plasma pulse may be applied to stabilize the surface of the exposed semiconductor layer 140.

Next, passivation layer 170 is formed by a spin coating method or a slit coating method. Passivation layer 170 may include organic polymer.

Figure 4A:
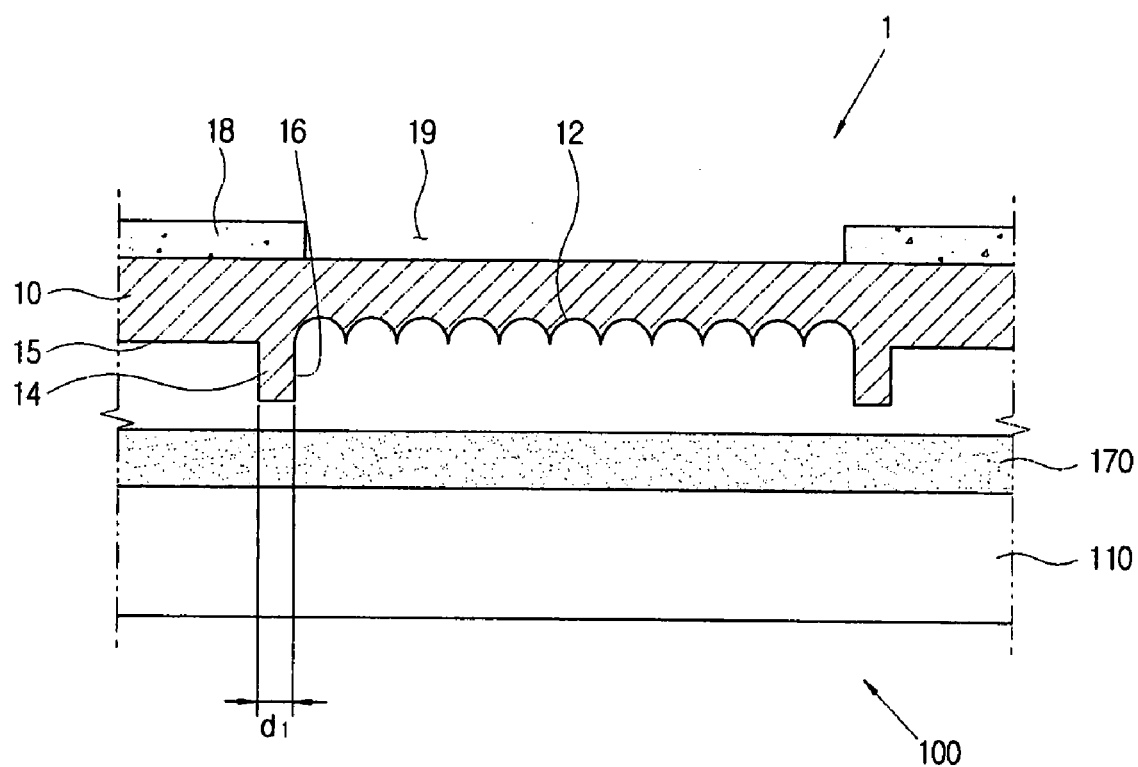
FIGS. 4A through 4D are sectional views illustrating a manufacturing process of a thin film transistor substrate according to the first embodiment of the present invention.

Referring to FIG. 4A, mold 1 is disposed over passivation layer 170 to form embossing pattern 175 (see FIG. 4C) thereon.

Mold 1 includes supporting frame 10, pattern forming part 12 disposed on one surface of supporting frame 12, and protrusion 14 projecting from supporting frame 10 and disposed along the circumference of pattern forming part 12. Flat part 15 is formed on the surface of supporting frame 10 around pattern forming part 12. Protrusion 14 projects from flat part 15 and is disposed on a boundary region between flat part 15 and pattern forming part 12. The inside wall 16 of protrusion 14 toward pattern forming part 12 stands upright from the surface of supporting frame 10. Mask 18 has an opening 19 corresponding to pattern forming part 12 and adheres to the opposite surface of supporting frame 10. A pattern is formed on pattern forming part 12 to correspond to a desired pattern to be formed on the organic layer, such as a concavo-convex pattern or an embossing pattern. The angle (a) between the inside wall 16 of protrusion 14 and the surface of supporting frame 10 may be in the range of 80 degrees to 100 degrees. The range of the angle is an error range where the pattern may efficiently be provided. If the angle (a) is out of the range, a desired pattern may not be formed on the passivation layer 170.

Figure 4B:
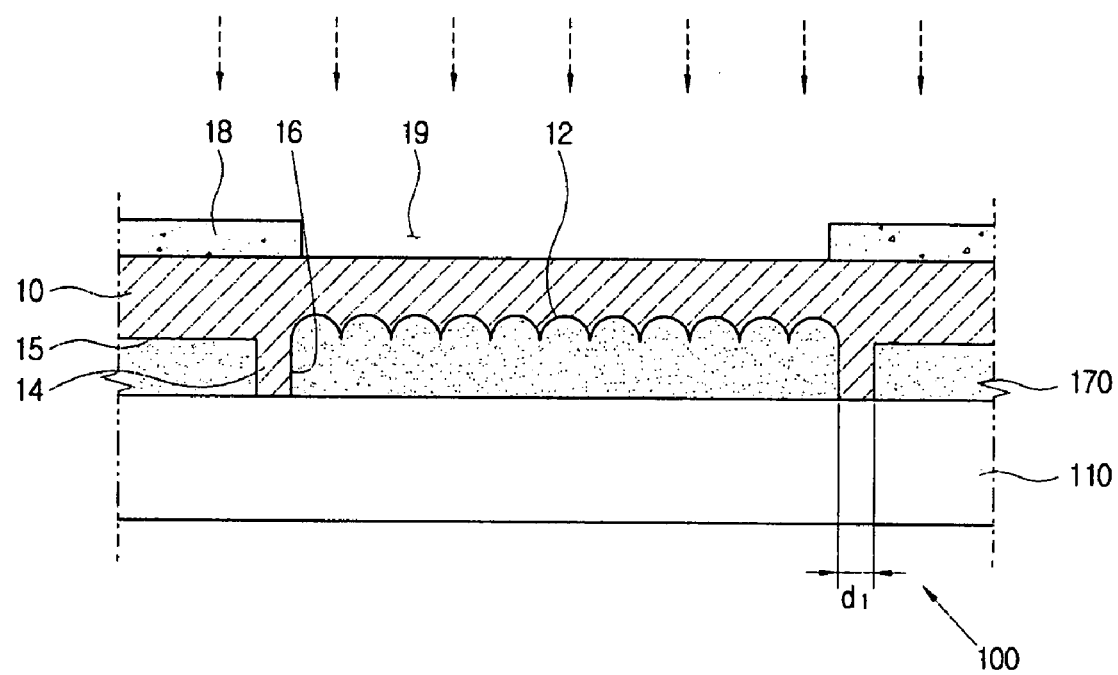

Referring to FIG. 4B, when mold 1 is pressed against passivation layer 170, embossing pattern 175 is printed by pattern forming part 12 on the surface of passivation layer 170. Further, protrusion 14 presses the edge of the passivation layer 170 to remove any portion of passivation layer 170 outside of the pattern formed region, thereby improving the yield of embossing pattern 175. In other words, when an unpatterned portion of the passivation layer 170 is removed by mask 18, an undesired pattern which may be formed because of the resolution limitation of the mask and diffraction of light at the edge of passivation layer 170 is removed by protrusion 14. The width (d1) of the end portion of protrusion 14 may be in the range of 5 μm to 20 μm. If the width d1 of protrusion 14 is large, the pressed organic material having insufficient fluidity will not be removed but remain, thereby not forming a desired pattern. If the width d1 of protrusion 14 is too small, the organic layer may not be removed efficiently.

While the mold 1 presses passivation layer 170, light is irradiated to cure the passivation layer. As mold 1 includes a transparent material which transmits light, the passivation layer is cured and exposed with e embossing pattern 175 is kept in its shape. The mold 1 may include polydimethylsiloxane (PDMS), for example.

Figure 4C:
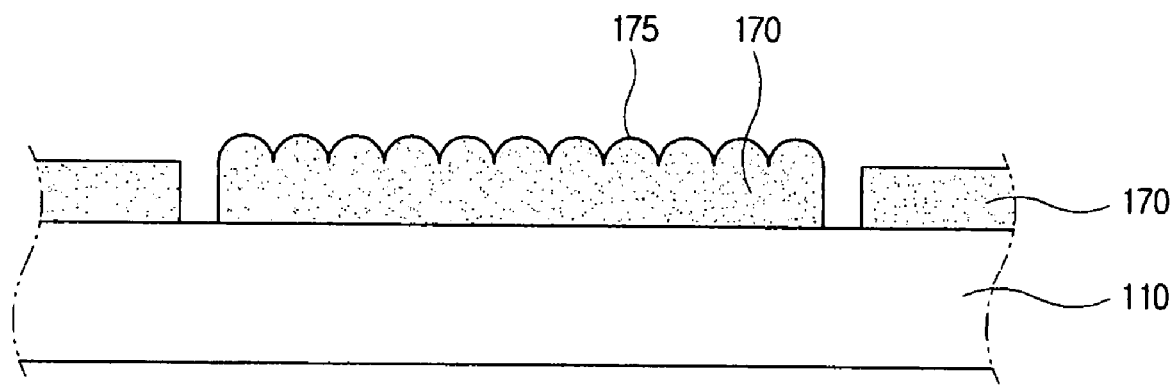
Figure 4D:
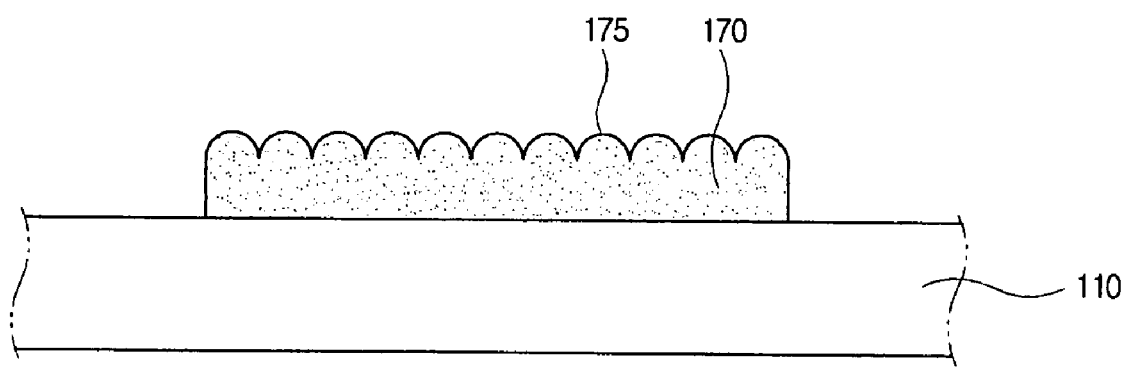

Referring to FIG. 4C, the mold 1 is removed. Then, referring to FIG. 4D, passivation layer 170 is developed to form the embossing pattern 175 portion of the organic material layer that has been exposed to light and the other portion thereof is removed.

Accordingly, an unnecessary portion of passivation layer 170 is removed from the edges of the first insulating substrate, and thus the sealant (not shown), may strongly adhere substrates 100 and 200 to each other. Further, removal of the excess passivation layer minimizes the possibility of defective contact between a driving chip (not shown) and gate pad 123 or data pad 164 when the driving chip is connected to the edge of the first substrate.

In the exemplary embodiment, passivation layer 170 having embossing pattern 175 is formed on a portion exposed to light using a photoresist organic material. However, passivation layer 170 having embossing pattern 175 may be formed on a portion not exposed to light using a different kind of photoresist organic material. In this case, the opening 19 of mask 18 is patterned corresponding to a portion of passivation layer 170 to be removed.

After passivation layer 170 with embossing pattern 175 is formed, ITO or IZO is deposited on passivation layer 170 and etched by photolithography to form pixel electrode 180 connected to drain electrode 163 through drain contact hole 171. Pixel electrode 180 has an embossing pattern due to embossing pattern 175 disposed on the passivation layer below. Contact subsidiary parts 181 and 182 are formed to be connected to gate pad 123 and data pad 164 through gate pad contact hole 172 and data pad contact hole 173, respectively.

Thereafter, a reflective material is deposited on pixel electrode 180 and patterned to form reflective layer 190 at least on a portion of pixel electrode 180. The reflective layer 190 may include silver, chrome, an alloy of silver and chrome, aluminum or a double layer of aluminum/molybdenum. Reflective layer 190 is formed in the reflecting area except the transmitting area. Reflective layer 190 also has an embossing pattern due to embossing pattern 175. Reflective layer 190 is connected to drain electrode 163 through drain contact hole 171 to receive an electric signal, which is applied to liquid crystal layer 300 disposed over reflective layer 190. Then, an alignment layer (not shown) is formed, thereby completing first substrate 100 according to the first embodiment of the present invention.

Hereinafter, a manufacturing method of a display device according to the second embodiment of the present invention will be described as follows.

FIGS. 5A through 5D schematically illustrate a method of forming embossing pattern 175 on the passivation layer 170 of the first substrate 100. In the second embodiment, the embossing pattern 175 is formed by the mold shown in FIG. 1B.

Figure 5A:
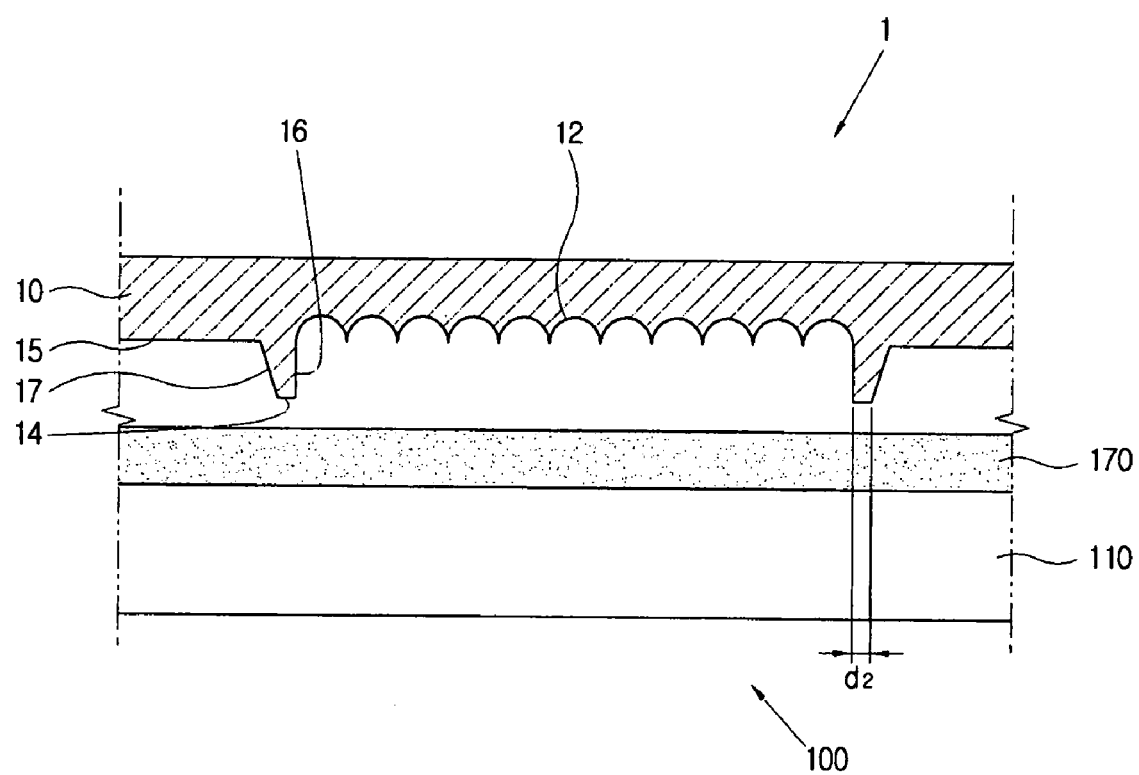
FIGS. 5A through 5D are sectional views illustrating a manufacturing process of a thin film transistor substrate according to the second embodiment of the present invention.

Referring to FIG. 5A, mold 1 is disposed over passivation layer 170. Mold 1 according to the second embodiment does not have a mask on an opposite surface thereof. Further, protrusion 14 has a shape such that the cross-sectional area becomes smaller further from supporting frame 10. That is, inside wall 16 of protrusion 14 stands upright from the surface of supporting frame 10, and outside wall 17 thereof inclines to the surface of supporting frame 10, as shown in FIG. 5A. The width (d2) of the end portion of protrusion 14 may be in a range of 5 μm to 20 μm. Protrusion 14 with this shape allows passivation layer 180 to be efficiently removed when mold 1 presses passivation layer 180.

Figure 5B:
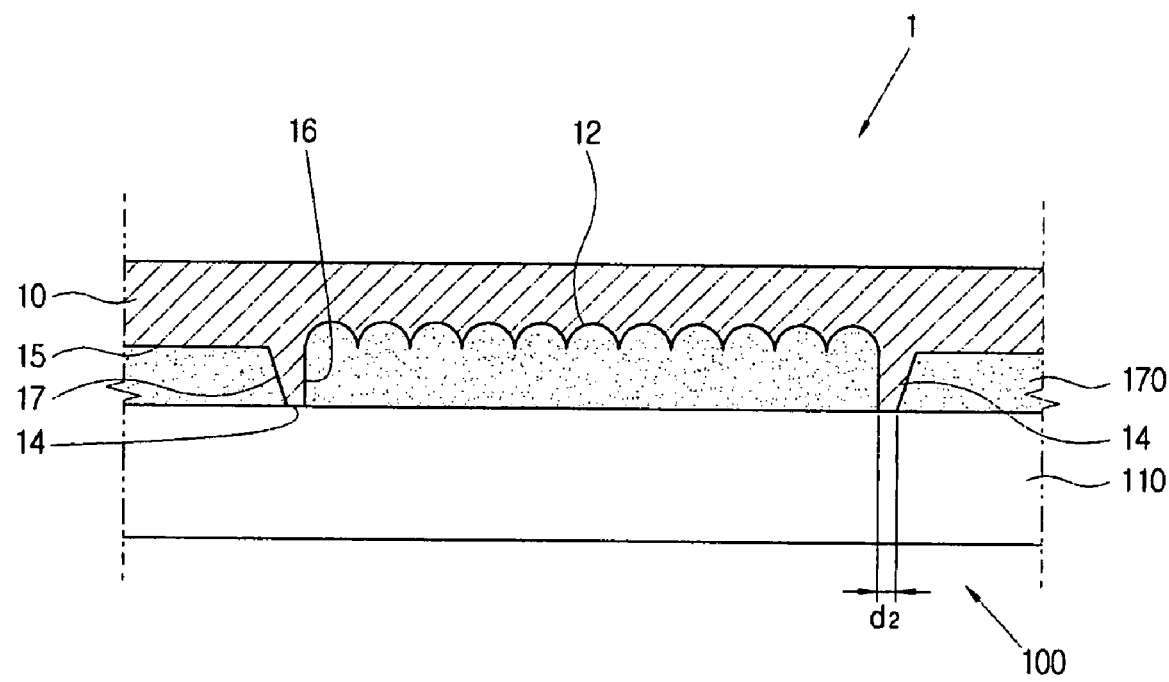
Figure 5C:
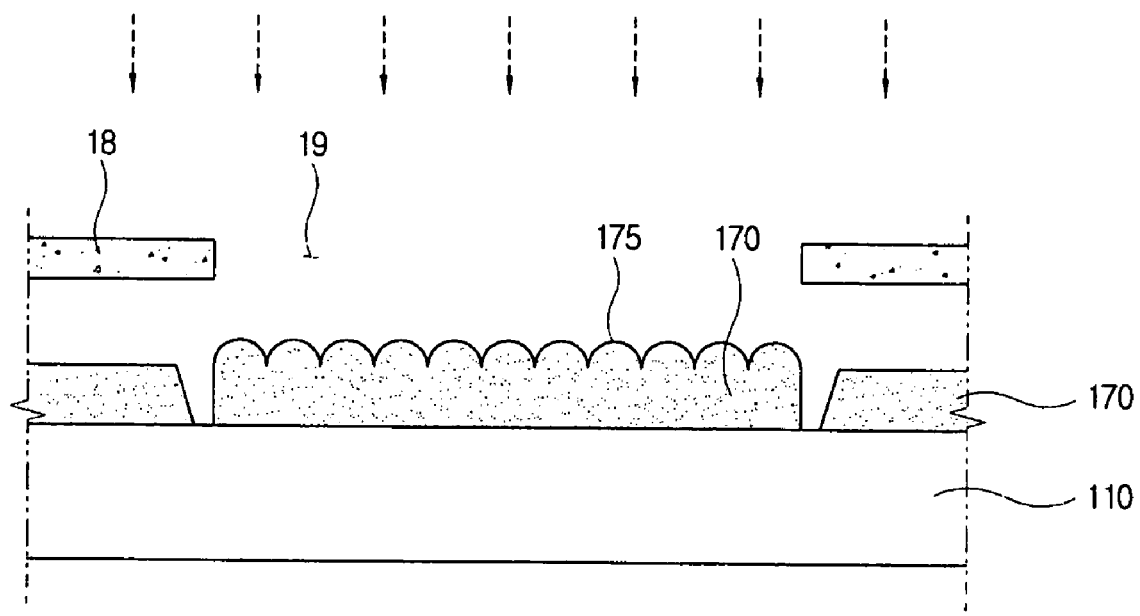

Referring to FIG. 5B, mold 1 is pressed against passivation layer 170 to form the embossing pattern on the surface of the passivation layer (see FIG. 5C).

Referring to FIG. 5C, after removing mold 1, mask 18 having opening 19 is aligned over the passivation layer to expose the embossing pattern, and light is irradiated upon the passivation layer.

Figure 5D:
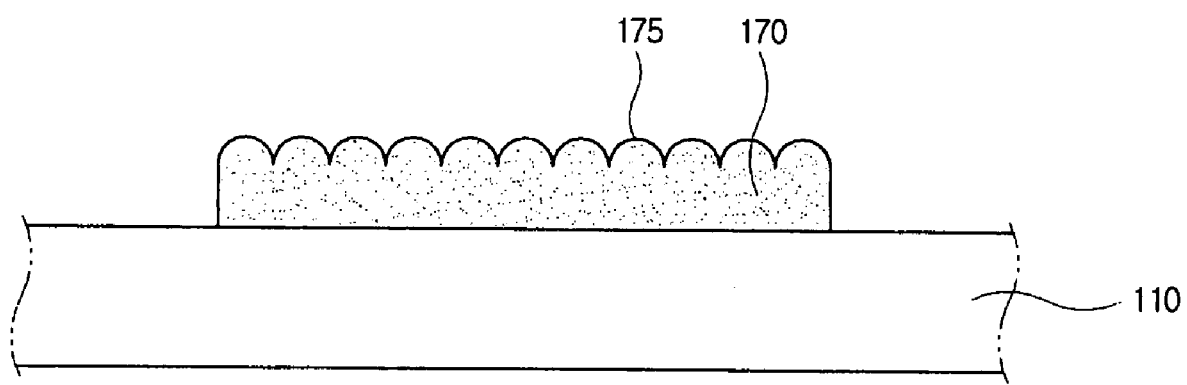

Referring to FIG. 5D, passivation layer 170 is developed, and then an unpatterned portion of the passivation layer is removed.

Then, pixel electrode 180 (see FIG. 3B) and reflective layer 190 (see FIG. 3B) are formed on the passivation layer by the method described in the first embodiment, thereby completing the first substrate 100.

Meanwhile, the mold is used for forming the embossing pattern on the reflective layer in the aforementioned embodiments. However, the mold may be employed for forming various patterns in the display device as well.

As mentioned above, the present invention provides a mold for a display device to improve a yield of a desired pattern and a manufacturing method of a display device using the same.

It will be apparent to those skilled in the art that various modifications and variations can be made in the present invention without departing from the spirit or scope of the invention. Thus it is intended that the present invention cover the modifications and variations of this invention provided they come within the scope of the appended claims and their equivalents.

What is claimed is:

1. A mold for a display device, comprising:
   a supporting frame comprising a first side and a second side facing the first side;
   at least one pattern forming part provided on the first side of the supporting frame;
   at least one flat part provided on the first side of the supporting frame; and
   a protrusion projecting from the supporting frame, the protrusion disposed between the flat part and the pattern forming part, wherein an inside wall of the protrusion toward the pattern forming part stands upright from the first side of the supporting frame.

2. The mold according to claim 1, wherein the pattern forming part has a concavo-convex pattern.

3. The mold according to claim 1, wherein an outside wall of the protrusion inclines to the first side of the supporting frame so that a cross-sectional area of the protrusion taken along transversely becomes smaller further from the supporting frame.

4. The mold according to claim 1, further comprising a mask placed on the second side of the supporting frame and having an opening corresponding to the pattern forming part.

5. The mold according to claim 4, wherein the angle between the inside wall of the protrusion and the first side of the supporting frame is substantially in the range of 80 degrees to 100 degrees.

6. The mold according to claim 4, wherein the width of the protrusion is substantially in the range of 5 μm to 20 μm.

7. The mold according to claim 6, wherein the supporting frame and the protrusion comprises polydimethylsiloxane (PDMS).

* * * * *